Nov. 1, 1932.　　　　C. C. FIGGE　　　　1,885,193
BUILDING GASKET
Filed May 20, 1929
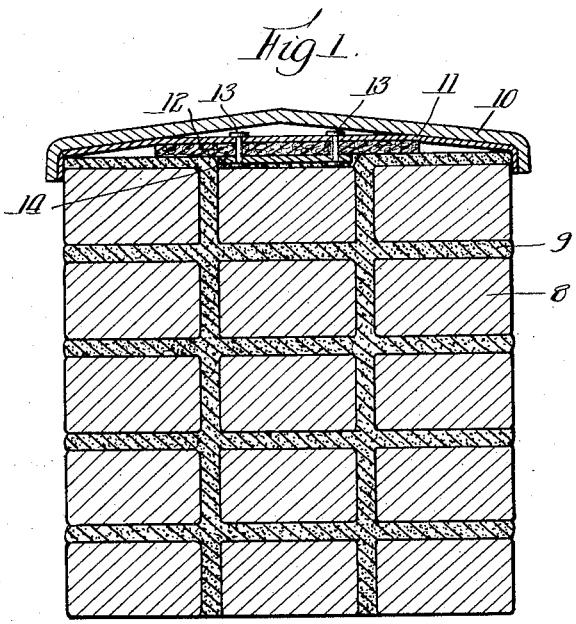
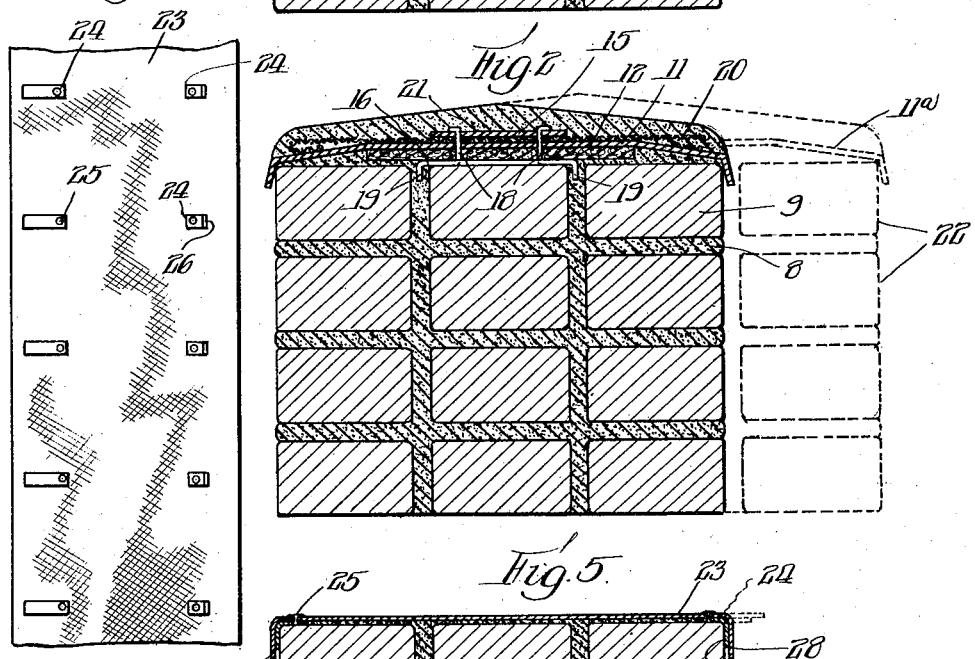
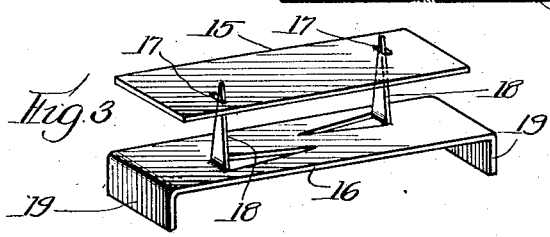
Inventor:
Carroll C. Figge,
By Kent W. Worrell
atty.

Patented Nov. 1, 1932

1,885,193

UNITED STATES PATENT OFFICE

CARROLL C. FIGGE, OF CHICAGO, ILLINOIS

BUILDING GASKET

Application filed May 20, 1929. Serial No. 364,416.

This invention relates in general to a gasket for shedding or deflecting water and is particularly adapted for use in building construction, although it may have a more general use wherever applicable. Among the objects of the invention are to provide a barrier against the passage of water or moisture in a wall of a building; to fix the drip at the side of a wall; to position a gasket impervious to moisture in a building structure; to secure a gasket of this kind in a wall; to provide an adjustable securing means for a gasket to accommodate the same gasket to various wall thickness; to provide a wall gasket which has a predetermined drip surface at each side of the wall; and in general to produce the gasket herein shown and described.

In the accompanying drawing Fig. 1 is a section of a brick wall showing a gasket constructed in accordance with the principles of this invention applied below a coping tile; Fig. 2 illustrates a modified coping gasket of a different structure applicable to walls of different thicknesses; Fig. 3 is a perspective of a clamping and positioning device as shown in Fig. 2; Fig. 4 is a face view of a strip gasket with fastening clips, one bent at right angles and the other before it is bent to accommodate the gasket to a wall which varies slightly in width; and Fig. 5 is a section illustrating the application of the gasket of Fig. 4 to a wall.

This invention is particularly applicable to an exposed parapet wall, either with or without a coping of tile or other material and is designed to prevent the passage of water or moisture downwardly through the wall, thereby causing loosening of the bricks, disintegration of the wall, leakage and consequent damage to the interior of the building. Although particularly shown and described as applied to the top of a brick wall, this gasket is also applicable over the tops and at the bottoms of door and window frames, between adjacent walls and between foundation and side walls to prevent the passage of water or moisture therebetween.

Referring more particularly to the drawing, a brick wall as shown in Fig. 1 has a plurality of rows of bricks 8 connected by mortar 9 and over the top of the wall is a coping 10 of tile or other material. If this coping consists of separate pieces abutting each other, water may enter between the joints, gradually causing the disintegration of the wall, and if the wall is unprotected by a coping at the top it is all the more likely to be damaged by the water.

A gasket 11 may be made of thin sheet metal but preferably is a woven or felted fabric saturated with asphalt or other water-resisting material in strip form of a width to fit entirely over the wall below the coping 10. In order to raise the central portion of the gasket to divert at both sides thereof, a block or filler 12 of like or different material than the gasket may be inserted under the gasket and secured thereto by rivets 13.

In order to secure the gasket in place upon a wall, a plate or block 14 may also be secured to the under side of the gasket by rivets 13 or other fastening devices, and this positioning plate 14 may be seated in the mortar over one of the bricks or it may be inserted in a space formed at the top of the wall over one course of bricks, as shown in Fig. 1.

In another form of the invention as shown by Fig. 2, the gasket 11 overlies the top of the wall and extends over the edges, as shown in Fig. 1 with a central filler 12 secured thereto at intervals by clamping devices each comprising an upper plate 15 and a lower plate 16, as shown more clearly in Fig. 3. The upper plate has perforations 17 for receiving tongues 18 formed and bent upwardly from the lower plate 16 and inserted through the gasket and filler 12 for binding them together, the protruding extremities of the tongue being bent over to hold the parts in place, as shown in Fig. 2.

To hold the gasket in place the extremities 19 of the lower plate 16 are bent downwardly so that they will engage in the mortar in the sides of one of the courses of the bricks, preferably the center one, the plate 16 preferably resting directly upon this course of bricks and the bent extremities being inserted in the mortar or cement while it is yet soft.

Instead of employing a separate coating 10 as shown in Fig. 1, it is also contemplated to insert a strip 20 of wire gauze netting or the like on top of the gasket 11 which is held in place by rivets, as 13, or between the plates 15 and 16 and providing a reinforcing mesh for the addition of a mortar or cement cap 21 which is molded or shaped over the top of the wall, preferably with water shedding inclines at both sides from the top thereof.

It is obvious that the same structure may be used for walls of different widths having one or more additional courses of bricks 22 by simply extending the gasket to a greater width as represented by 11$^a$ at one side only of the clamping plates 15 and 16.

In its simplest and most usable form the gasket consists of a strip 23 of felted or woven fabric coated with or impregnated with asphalt or other water resisting material and having metal clips 24 attached at intervals along the sides. Each clip consists of a short metal strip attached at one end of the strip near the edge of the fabric by a separate rivet 25 or by tongues of metal bent from the strip itself and inserted through the fabric in applying the strip thereto. The free end of each strip is disposed outwardly toward the edge of the fabric strip 23 and the clips 24 at one side of the strip are preferably bent at right angles to form a projection 26 for engaging the outer edge of one side of a wall 27, as shown in Fig. 5, the clip 24 at the other side extending straight beyond the wall when it is applied as indicated in the broken outline in Fig. 5 and the free end of the strip being bent downwardly to form an attaching portion 28 engaging the opposite outside edge of the wall, the gasket overlapping and extending beyond and below the fastening clips when the gasket is in place.

The gasket is thus positioned on a wall and does not require the attachment of the gasket to any of the interior courses of brick constituting the wall to hold the gasket in place. A coping or additional courses of brick, a frame or sill may be placed above or below the gasket and it will function as a water deterrent in any place it is used. It could be left exposed at the top of a wall as shown in Fig. 5 but preferably a coping or other superstructure is built on the wall above it.

Although the invention is described principally as a gasket for the top of a wall, it is obvious that it may be used in any other part of a wall or any building construction where it is desired to prevent the passage of moisture.

I claim:

1. A gasket of the class described comprising a flexible fabric strip with a bituminous coating, and separate fastening means thereon adapted to engage a wall to which it is applied for holding the gasket in place.

2. A gasket for a brick wall comprising a fabric coated with material impervious to moisture, and separate projecting means attached to the fabric for engaging at the sides of bricks constituting a wall for holding the gasket horizontally in place with respect to the bricks.

3. A water-proof gasket composed of fabric having bendable attaching means externally secured thereto and projecting therefrom adjustable to engage and hold the fabric in place on walls of variable width.

4. The combination with a wall, of a fabric gasket impervious to moisture inserted in the wall to prevent the passage of liquid from one side to the other thereof and overlapping the edge of the wall to form a drip.

5. A wall structure comprising material pervious to moisture, a fabric gasket saturated with material impervious to moisture, and fastening means secured to the gasket and bendable for engaging the pervious portions of the wall for holding the gasket in place with respect thereto.

6. A wall structure comprising material pervious to moisture, a coping therefor, and a gasket of saturated fabric impervious to moisture inserted in a horizontal layer between the coping and the pervious wall portion for preventing the downward passage of liquid into the pervious portion of the wall and externally attached projecting means for holding the gasket in place.

7. A wall gasket of fabric coated or saturated with material impervious to moisture, of means attached to the fabric and spaced apart for securing the fabric to a wall with a portion of each edge of the fabric overlapping the edge of the wall to form a water shedding drip.

8. A wall gasket comprising a strip of saturated fabric having spaced bendable fastening clips along the edges thereof, the clips along one edge being bent to engage the outer face of a wall along that side and the clips at the other side being left straight and overlapping the opposite edge of a wall to which the gasket is applied, the clips being bendable downwardly over the adjacent edge of the wall for adjustably fastening the gasket in place.

CARROLL C. FIGGE.